Figure 1:
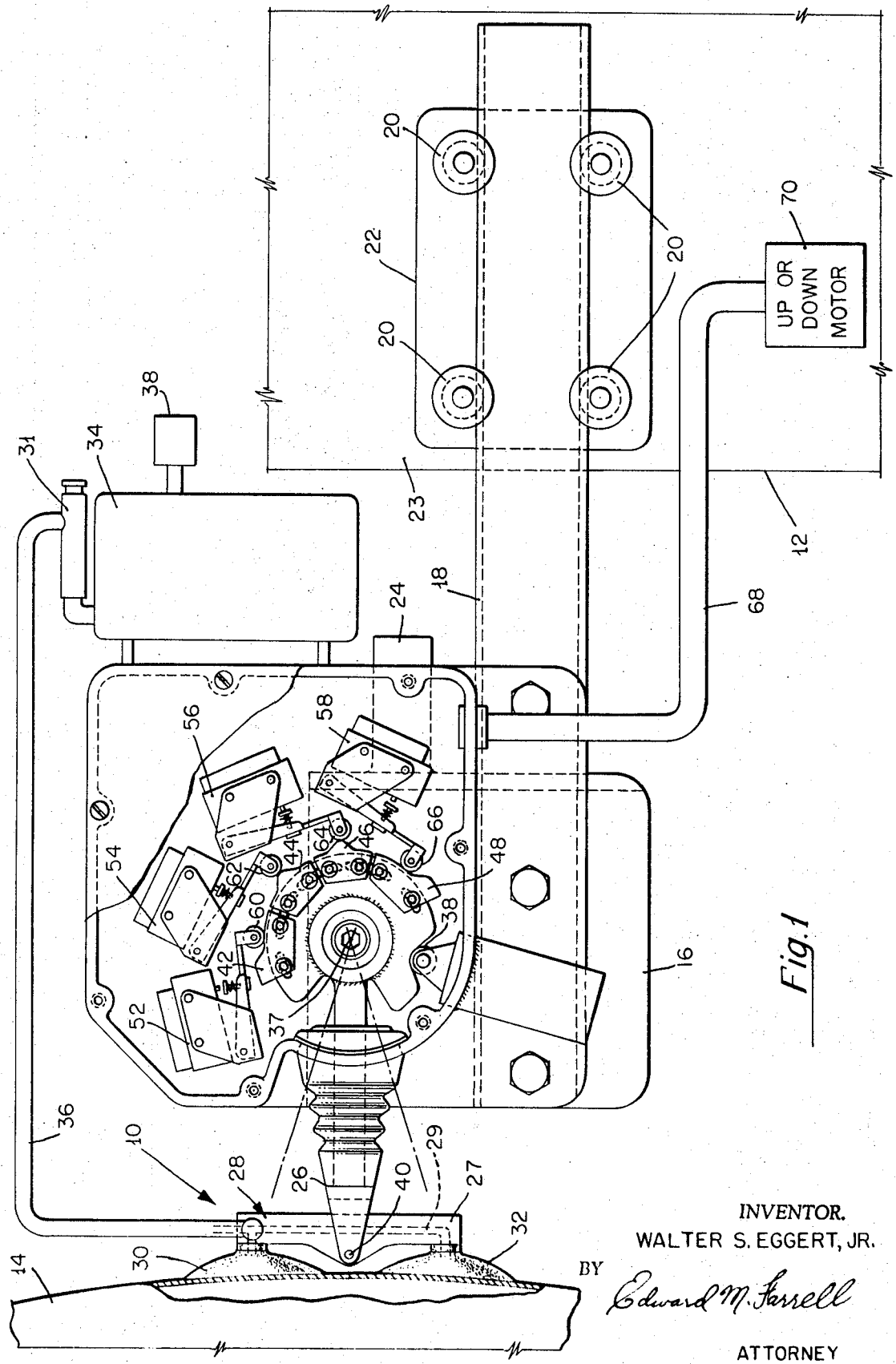

United States Patent

Eggert, Jr.

[15] 3,694,724
[45] Sept. 26, 1972

[54] VERTICAL MOVEMENT SENSOR
[72] Inventor: Walter S. Eggert, Jr., Huntingdon Valley, Pa.
[73] Assignee: The Budd Company, Philadelphia, Pa.
[22] Filed: Sept. 29, 1970
[21] Appl. No.: 76,346

[52] U.S. Cl. .................318/648, 14/71, 214/38 BA
[51] Int. Cl. ..............................................B64c 17/02
[58] Field of Search ..............14/71; 214/38 BA, 512; 318/648; 248/206 R, 207, 363

[56] References Cited

UNITED STATES PATENTS 3,038,185   6/1962   Moore..........................14/71
3,369,264   2/1968   Kirka............................14/71
3,543,318   12/1970  Tushim..........................14/71

Primary Examiner—Bernard A. Gilheany
Assistant Examiner—Thomas Langer
Attorney—Stowell and Stowell

[57] ABSTRACT

An automatic levelling system is provided for maintaining the relative position of two bodies. An extendible member movably mounted on one of the bodies is attached to the other body. Means including the extendible member are responsive to the relative movement between the two bodies to restore them to their original relative positions.

5 Claims, 2 Drawing Figures

INVENTOR.
WALTER S. EGGERT, JR.
BY Edward M. Farrell
ATTORNEY

VERTICAL MOVEMENT SENSOR

In many situations, it is necessary to line up the floors of two vehicles, for example, to permit transfer of material for passengers from one vehicle to the other. It is desirable in these cases to have the relative positions of the floors or platforms maintained in the same plane during the transfer operation. In many cases, the level of one of the floors may vary slightly during the transfer operation as a result of different load conditions.

An example wherein it is desirable to maintain the relative positions between two bodies involves the use of a passenger transfer vehicle where passengers are transferred from the vehicle to an aircraft or vice versa. One such type vehicle is described in a copending application entitled "Aircraft Transfer Vehicle," Ser. No. 762,443, filed Sept. 25, 1968, now U.S. Pat. No. 3,537,745 and assigned to the same assignee as the present invention. In a vehicle of the type described in this pending application, passengers are transferred from the vehicle to the aircraft. During the loading and unloading operation, the relative levels of the floors of the transfer vehicle and the aircraft may vary because of the variations in load conditions during the transfer operation. These variations in floor levels, if not remedied, create hazardous conditions for passengers moving to or from the vehicle and aircraft.

A number of different types of sensor elements have been used in the past to detect the change in levels between two bodies and to actuate means to automatically restore the two bodies to their original relative positions. One such sensing system is described in copending patent application entitled "Automatic Leveller Circuit," Ser. No. 15,537, filed Mar. 2, 1970 and assigned to the same assignee as the present invention. This latter copending application includes a description of an electrical system as well as a sensing means for automatically maintaining the levels of two floor bodies at their same relative positions despite the changes in loads between the two bodies.

While such aforementioned sensing devices which include coupling means between the two bodies have been satisfactory in many respects, in some cases a more positive coupling or attachment between the two bodies is desirable to achieve more positive response. At the same time, especially when aircrafts are involved, it is necessary that the sensing device be attached to the plane without any additional element being required on the plane before attachment.

It is an object of this invention to provide an improved sensing system for sensing and correcting for changes in the relative positions between two bodies.

It is a further object of this invention to provide an improved sensing device which may be attached to the plane without the necessity of additional elements permanently installed on the plane.

In accordance with the present invention, a system is provided for maintaining the relative position of a first body, such as a floor on an airplane, with respect to a second body, such as a floor or ramp of a passenger carrying vehicle. An extendible member is mounted to the first body. Means, which may include two suction cups, are secured to the extendible member to permit it to be attached to the second body. When the relative levels of the floors of the vehicle and aircraft changes, switching means are actuated as a result of a movement of the extendible member to drive a motor to restore the two floor levels to their original relative positions.

Figure 2:
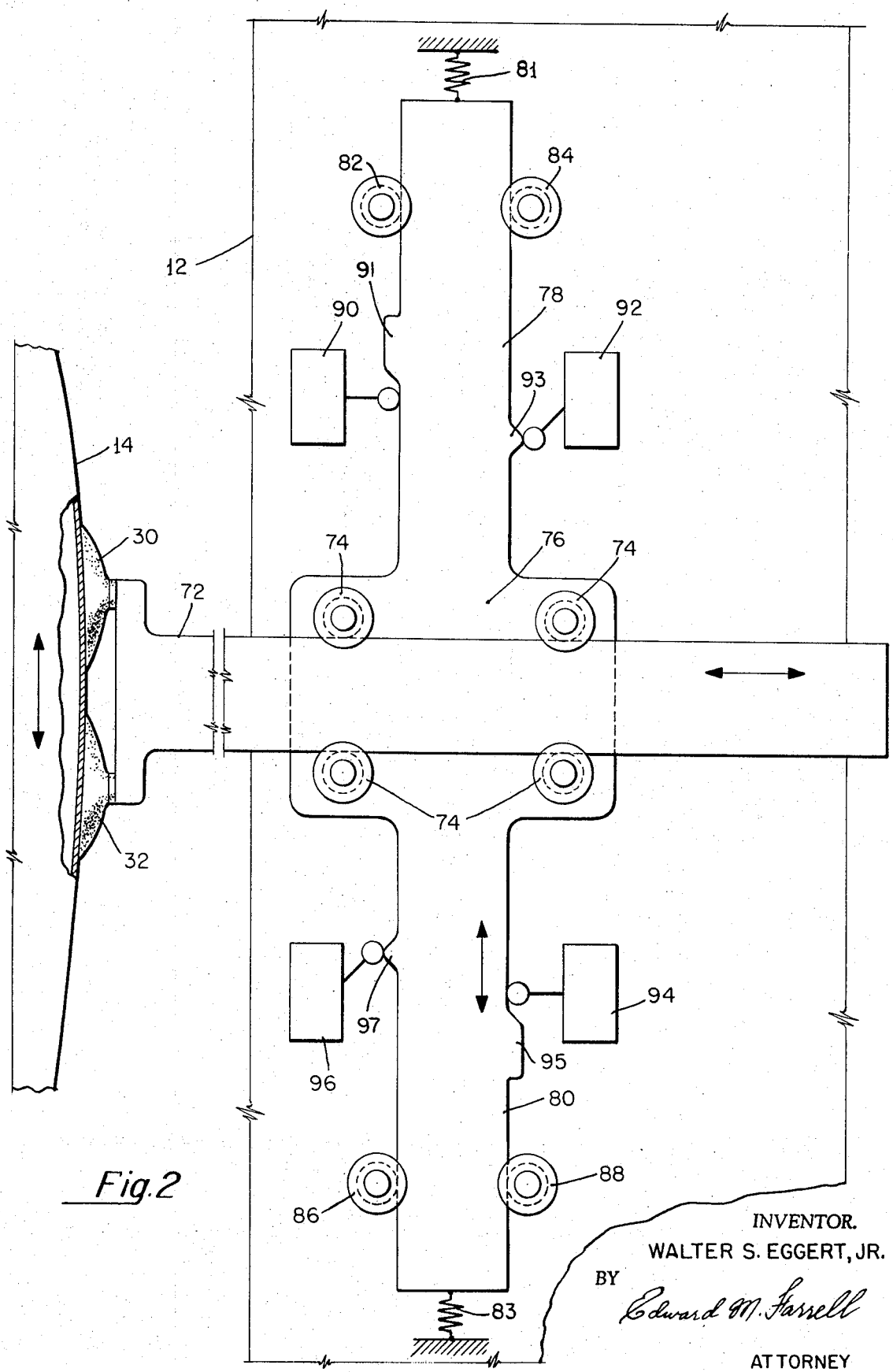

Other objects and advantages of the present invention will be apparent and suggest themselves to those skilled in the art, from a reading of the following specification and claims, in conjunction with the accompanying drawings, in which:

FIGS. 1 and 2 represent side views, partly broken away and in cross section, of two embodiments of a sensing system involving the present invention.

Referring to FIG. 1, an automatic levelling system includes the sensing means 10 movably mounted to a vehicle 12. The vehicle 12 may be of the type for transporting passengers between an airport terminal and an aircraft 14, such as described in the aforementioned patent entitled "Aircraft Transfer Vehicle."

In a typical situation, a driver of the vehicle 12 brings it relatively close to the aircraft 14 and then adjusts the ramp or platform of the vehicle to a level corresponding to the level of the floor of the aircraft 14. As passengers pass from one craft to the other, the floor level of the vehicle 12 with respect to the floor level of the aircraft 14 may vary either up or down. The variations may result from the transfer of passengers, variations in loads between the aircraft and the vehicle, or for other reasons.

The assembly 16 including the sensing device 10 mounted thereon is mounted to a rail 18 by any suitable means. The rail 18 is adapted to move in and out on a plurality of rollers 20. The rollers 20 are secured to a mounting plate 22 which in turn is secured to the side wall 23 of the vehicle 12. The entire assembly 16 including the sensing device 10, while illustrated in an extended operative condition, is normally held retracted by a latch 24 when the vehicle 12 is moving free of the aircraft 14. Such latches are well known and the details thereof are not illustrated.

After the vehicle 12 is moved within some predetermined distance of the aircraft and the initial floor levelling between the two crafts is attained, an operator releases the latch 24 making it possible for the operator to manually move the rail 18 over the rollers 20. The operator may then move the entire assembly outwardly so that an extendible member 26 is extended towards the aircraft 14. The extendible member 26 includes attachment assembly 28 for attachment to the surface of the aircraft 14.

The attachment assembly 28, which forms part of the sensing means 10, includes a coupling member 27 having a fluid passageway 29 therein. A pair of suction cups 30 and 32 are mounted to the coupling member 27 so that the interiors of the suction cups are fluid coupled to the passageway 29. The interior of the suction cups are both therefore connected through the coupling member 27. A flexible hose 36 is connected to the coupling member 27 to connect the passageway 29 to a compressor 34. The compressor 34 may be actuated by a switch 38. When the compressor is operative, exhaust pressure is created to evacuate the air within the suction cups 30 and 32 is evacuated through the hose 36. Air from the hose is passed into the atmosphere through an evacuator 31. The vacuum created with the suction cups 30 and 32 cause them to be firmly attached to the surfaces of the aircraft 14.

The extendible element 26 is pivotally mounted to a housing or frame 16 at pivot point 37. Thus the extendible element 26 is free to move up and down about the pivot point 38. The attachment assembly 28 is pivotally mounted to the end of the extendible element about the pivot point 40.

Changes in the relative positions between the aircraft 14 and the vehicle 12 cause the extendible element 26 to move up or down about the pivot point 37 depending upon the direction of relative movement between the two bodies. However, despite changes in the relative positions between the two bodies, the attachment assembly 28 carrying the suction cups 30 and 32 are maintained in a fixed relationship with respect to the plane 14. The assembly attachment 28 on the aircraft 14 may be considered the equivalent of a permanent mechanical mounting on the aircraft with means to permit the extendible element 26 to be pivotally attached thereto.

The use of two suction cups instead of one provides advantages. For example, if a single suction cup were used on the end of the extendible member 26 and the two attached bodies were moved relative to each other, the suction cup would be stressed with one portion of the cup tending to expand while another portion would tend to be compressed. The result would be a slight error in the sensing system. With a double suction cup arrangement, such as that illustrated, relative movement between the two bodies will not cause any flexing of the suction cups thereby making possible a more accurate sensing system responsive solely to the relative movement of the bodies.

The remainder of the system illustrated in FIG. 1 is also illustrated and described in the aforementioned patent application entitled "Automatic Leveller Circuit."

Cam means include a plurality of cam elements 42, 44, 46 and 48. When the floor or ramp level of the vehicle 12 varies with respect to the aircraft 14, the extendible pivotable element 26 moves about its axis 37 to actuate a plurality of switches which control a motor to restore the original relative positions between the vehicle and aircraft. The various cam elements 42, 44, 46 and 48 are adapted to actuate a plurality of switches 52, 54, 56 and 58. The switches include a plurality of rollers 60, 62, 64 and 66, which are disposed to be actuated by the various cam elements to open or close selected switches depending upon the position of the pivotable element 26.

The switches 52, 54, 56 and 58 are connected to a cable 68 to control various motor means 70 which may include an up and down motor to control the up and down motion of the vehicle 12.

Depending upon the operating states of the various switches, the motor means 70 will remain in a neutral position or move the vehicle up or down. When the floor level of the vehicle 12 changes with respect to the floor level of the vehicle 14, the motor means 70 will become operative as a result of the actuation of selected switches to return the floor level of the vehicle 12 to its original position with respect to the floor level of the aircraft 14.

The complete electrical system is described in the aforementioned copending patent application entitled "Automatic Leveller Circuit." Such circuits will not be redescribed since they are only indirectly related to the subject invention, the subject invention being particularly related to the attachment assembly which is adapted to be attached to the surface of the vehicle 14.

Referring particularly to FIG. 2, a somewhat different arrangement for attaching the suction cups to the surface of an airplane 14 is illustrated. In this case, however, the extendible means 72 is not pivotable about a point on the vehicle 12. For purposes of clarity the compressor and various elements for producing vacuum in the suction cups 30 and 32 are not illustrated, it being understood that the same arrangement illustrated and described in connection with Fig. 1 may also be used with the arrangement of FIG. 2.

The suction cups 30 and 32 are fixedly mounted to the end of the extendible element 72. An operator may manually extend the extendible element 72 through a plurality of rollers 74 until the suction cups 30 and 32 are attached to the surface of the aircraft.

The rollers 74 are mounted to a plate 76. The plate 76 includes a pair of extending portions 78 and 80. The plate 76 and all parts associated therewith is adapted to be moved up and down and may be held normally centered by biasing springs 81 and 83 fixedly mounted to the vehicle 12.

The extending portion 78 is adapted to ride vertically up and down along rollers 82 and 84. The extending portion 80 is adapted to ride vertically up and down along rollers 86 and 88. The entire plate member 76 is adapted to be moved up and down in accordance with the movement of the extendibel portion 72.

When the extendible element 72 extends upwardly or downwardly, various selected ones of the switches 90, 92, 94 and 96, associated with various rollers, are actuated by cam elements 91, 93, 95 and 97. The various switching circuits made operative by the switches and cam elements are described in the aforementioned application "Automatic Leveller Circuit" and will not be redescribed in detail since such circuitry is only indirectly related to the present invention.

The operation of the system illustrated in FIG. 2 is basically the same as that illustrated in FIG. 1. The difference in FIG. 2 is that there is no pivotable mounting of the extendible element as is the case in FIG. 1.

The use of suction cups for mounting to the aircraft has provided a solid attachment of the sensing means to the aircraft. While a single suction cup may also be employed, it is realized that the same accuracy would not be attainable as with a double suction cup system. In some cases, it may be desirable to use other means, such as adhesive, on the end of the extendible member to attain firm attachment with the surface of the aircraft.

While the subject invention has been described in connection with a particular type of passenger vehicle and aircraft, it is apparent that it may be used wherever two bodies are involved and it is desired to maintain the bodies in fixed relative positions with respect to each other.

What is claimed is:

1. An apparatus for maintaining a vehicle part such as a passenger ramp in a desired elevation with an aircraft frame portion, including,
    a. a horizontally extensible member mounted on a support by a vehicle,
    b. a vertical motion sensing apparatus carried by said horizontally extensible member,
    c. said motion sensing apparatus carrying a pair of vacuum cups adapted for horizontal engagement to the side of an aircraft, d. means for generating a vacuum for the interior of said vacuum cups,
e. said vacuum cups being vertically spaced and rigidly secured relative to each other, whereby any deformation of one vacuum cup in a vertical direction is inhibited by the normal holding force of the other vacuum cup,
f. whereby the horizontally extensible member is adapted to be held against the side of an aircraft by vacuum force of the vacuum cups.

2. The apparatus of claim 1 wherein said motion sensing apparatus includes a pivoted arm whose outermost end carries said vacuum cups.

3. The apparatus of claim 1 wherein said motion sensing apparatus includes a horizontally disposed, reciprocating arm, which arm is in turn supported for vertical motion by a vertically reciprocating bar member, said vacuum cups carried by an end of said horizontal arm.

4. The apparatus of claim 2 including a flexible hose coupled from said vacuum cups to said vacuum generating means.

5. The apparatus of claim 3 including a flexible hose coupled from said vacuum cups to said vacuum generating means.

* * * * *

UNITED STATES PATENT OFFICE
CERTIFICATE OF CORRECTION

Patent No. 3,694,724　　　　　　　　Dated September 26, 1972

Inventor(s) Walter S. Eggert, Jr.

It is certified that error appears in the above-identified patent and that said Letters Patent are hereby corrected as shown below:

Assignee:  Boothe Airside Services, Inc.
　　　　　　San Francisco, California

Signed and sealed this 17th day of April 1973.

(SEAL)
Attest:

EDWARD M. FLETCHER, JR.　　　　　　　　ROBERT GOTTSCHALK
Attesting Officer　　　　　　　　　　　Commissioner of Patents